US006995989B1

(12) United States Patent
Wang (10) Patent No.: US 6,995,989 B1
(45) Date of Patent: Feb. 7, 2006

(54) HALF-BRIDGE-TYPE CONTROL SIGNAL GENERATING CIRCUIT AND METHOD THEREOF

(75) Inventor: Yao-Chen Wang, Taipei (TW)

(73) Assignee: Niko Semiconductor Co., Ltd., Taipei (TW)

(*) Notice: Subject to any disclaimer, the term of this patent is extended or adjusted under 35 U.S.C. 154(b) by 0 days.

(21) Appl. No.: 10/968,082

(22) Filed: Oct. 20, 2004

(51) Int. Cl.
*H02M 3/335* (2006.01)
*H02H 7/122* (2006.01)

(52) U.S. Cl. .................... 363/21.08; 363/98; 363/56.03
(58) Field of Classification Search ............ 363/21.04, 363/21.08, 56.02, 56.03, 132, 98
See application file for complete search history.

(56) References Cited

U.S. PATENT DOCUMENTS

| | | | | |
|---|---|---|---|---|
| 4,177,389 A | * | 12/1979 | Schott | 307/64 |
| 6,549,429 B2 | * | 4/2003 | Konno | 363/21.04 |
| 6,650,551 B1 | * | 11/2003 | Melgarejo | 363/16 |
| 6,858,996 B2 | * | 2/2005 | Green | 315/291 |
| 6,888,728 B2 | * | 5/2005 | Takagi et al. | 363/17 |
| 6,900,993 B2 | * | 5/2005 | Lin et al. | 363/17 |
| 6,906,931 B1 | * | 6/2005 | Batarseh et al. | 363/17 |

* cited by examiner

*Primary Examiner*—Bao Q. Vu
(74) *Attorney, Agent, or Firm*—Troxell Law Office, PLLC (57) ABSTRACT

A half-bridge-type control signal generating circuit outputs two control signals to control directly and drive switching actions of two electronic switches of a half-bridge-type circuit architecture. The half-bridge-type control signal generating circuit comprises an AND-gate logic unit, a NAND-gate logic unit, a circuit protection unit, a function generator, a clock generator, a soft boot unit connected to the clock generator, a sample and hold unit, a first comparator connected to the soft boot unit and the function generator, an OR-gate logic unit connected to the soft boot unit, the first comparator, the AND-gate logic unit and the NAND-gate logic unit, a second comparator connected to the sample and hold unit, the function generator, the AND-gate logic unit and the NAND-gate logic unit, and a dead time control unit connected to the function generator, the AND-gate logic unit and the NAND-gate logic unit.

8 Claims, 5 Drawing Sheets

HALF-BRIDGE-TYPE CONTROL SIGNAL GENERATING CIRCUIT AND METHOD THEREOF

FIELD OF THE INVENTION

The present invention relates to a half-bridge-type control signal generating circuit and a method thereof and, more particularly, to a signal generating circuit and a method thereof, which can output control signals and directly control and drive switching actions of a half-bridge circuit architecture to accomplish power conversion and transmission.

BACKGROUND OF THE INVENTION

For increasingly complex electronic and computer devices, power source devices become increasingly important. Power source devices can be divided into two categories: linear type and switching type. Because linear-type power source devices have more disadvantages, all power source devices manufactured now all of the switching-type.

The power supply for a backlight source of a TFT LCD panel makes use of an inverter circuit to convert DC power into AC power for energy conversion and driving of a cold cathode fluorescent lamp (CCFL). Conventional inverter circuits can be divided into half-bridge-type, full-bridge-type and push-pull-type according to different circuit topologies. An inverter circuit is a circuit for converting DC power into AC power.

Figure 1:
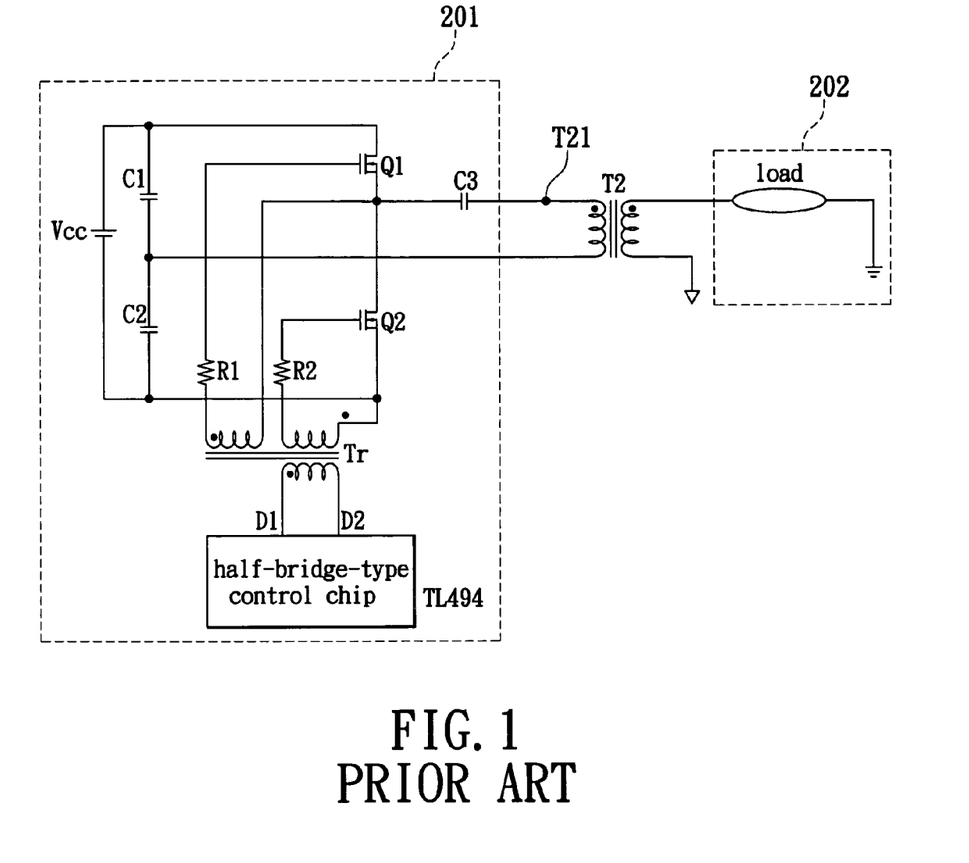
FIG. 1 is a circuit diagram showing how a conventional half-bridge-type inverter circuit drives a load.

As shown in FIG. 1, a transformer T2 divides the circuit into a front-end circuit at the primary side 201 and a rear-end circuit at the secondary side 202.

Figure 2:
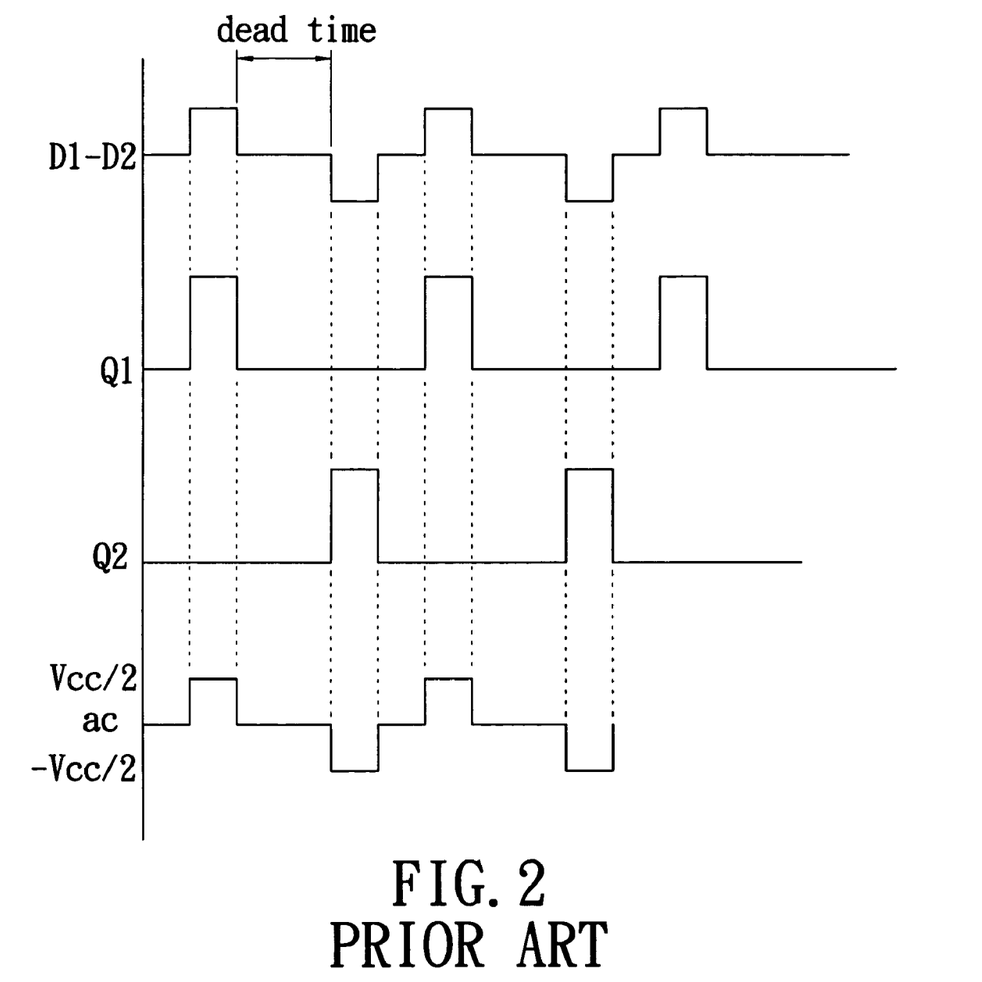
FIG. 2 is a waveform diagram of control signals output by a conventional half-bridge-type control chip and an output voltage at the load end.

The front-end circuit at the primary side 201 comprises a DC voltage source Vcc, two electronic switches (Q1, Q2), a half-bridge-type control chip TL494, two capacitors (C1, C2) and an isolation transformer Tr. The rear-end circuit at the secondary side 202 comprises a load. Reference is also made to FIG. 2. The half-bridge control chip TL494 outputs control signals D1–D2 via two output terminals D1 and D2. The control signals D1–D2 control switching actions of the two electronic switches Q1 and Q2 via the isolation transformer Tr, respectively. The two electronic switches Q1 and Q2 are n-channel FETs or p-channel FETs. Through switching actions of the two electronic switches Q1 and Q2, electric energy stored in the capacitors C1 and C2 can be transferred to a primary side terminal T21 of the transformer T2 via a coupling capacitor C3 to form AC power source ac. The voltage of the capacitors C1 and C2 is half (Vcc/2) that of the DC voltage Vcc. The AC power source ac is used to provide energy for the transformer T2, which boosts and converts the ac power source to the secondary side 202 for driving the load.

The above conventional half-bridge-type inverter circuit requires an isolation transformer to control switching actions of the electronic switches Q1 and Q2. The half-bridge-type control chip TL494 can't directly drive the electronic switches Q1 and Q2. Moreover, both the electronic switches Q1 and Q2 used in the conventional half-bridge-type inverter circuit are n-channel FETs or p-channel FETs to cause larger energy loss.

Reference is made to FIG. 1 again. The actions of the first switch Q1 and the second switch Q2 are staggered by a small period of time, and are on/off alternately. Therefore, a small period of dead time is required for the control signals D1–D2 shown in FIG. 2 to avoid burnout of the transformer T2 due to the first and second switches Q1 and Q2 being simultaneously on. Moreover, the control signals D1–D2 need to control and change the switching actions of the first and second switches Q1 and Q2 for providing the required power for the load based on the power requirement of the load. Additionally, the control signals D1–D2 need to stop the switching actions of the first and second switches Q1 and Q2 for accomplishing circuit protection according to various situations at the load end and various working statuses of the circuit, such as a too-low output voltage, a too-high output voltage, an open-circuited lamp or a too-high temperature.

SUMMARY OF THE INVENTION

Accordingly, one object of the present invention is to provide a half-bridge-type control signal generating circuit and a method thereof, which can provide two control signals to control switching actions of two electronic switches of a half-bridge-type inverter circuit for converting DC power into AC power and providing an electric power for a load via a transformer.

A half-bridge-type control signal generating circuit of the present invention is connected to a primary side of a transformer via two electronic switches to control on/off states of the two electronic switches and convert DC power into AC power sent to the primary side of the transformer. Moreover, the leakage inductance of the transformer and capacitors (C1, C2, and C5) is used to form a resonance network for generating a sinusoidal wave, hence providing the required electric power for the load. Additionally, a feedback circuit is used to fetch the load state at the secondary side of the transformer. After being processed by the half-bridge-type control signal generating circuit, control signals are then output to accomplish power regulation and protection at the load end.

The present invention can also make use of a power source protection unit. Various situations of the load end at the secondary side of the transformer and various statues of the circuit, such as a too-low output voltage, a too-high output voltage, an open-circuited lamp or a too-high temperature, are obtained via the feedback circuit to stop the switching actions of the two electronic switches for accomplishing circuit protection.

Furthermore, the present invention makes use of a dead time control unit to provide a constant dead time for avoiding burnout of the transformer due to the two electronic switches being simultaneously on. Moreover, the present invention can control and change the switching actions of the two electronic switches to provide the required electric power for the load based on the power requirement at the load end. Additionally, the present invention uses a soft boot unit to activate the two electronic switches for avoiding a too-large spike current or voltage when activating and lengthening the lifetime of the lamp.

The present invention can further use a sample and hold unit to receive a voltage feedback signal of the load end and perform a hold action of the voltage feedback signal at each clock signal for improving the imbalanced phenomenon of signals output to the load in the prior art.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 3:
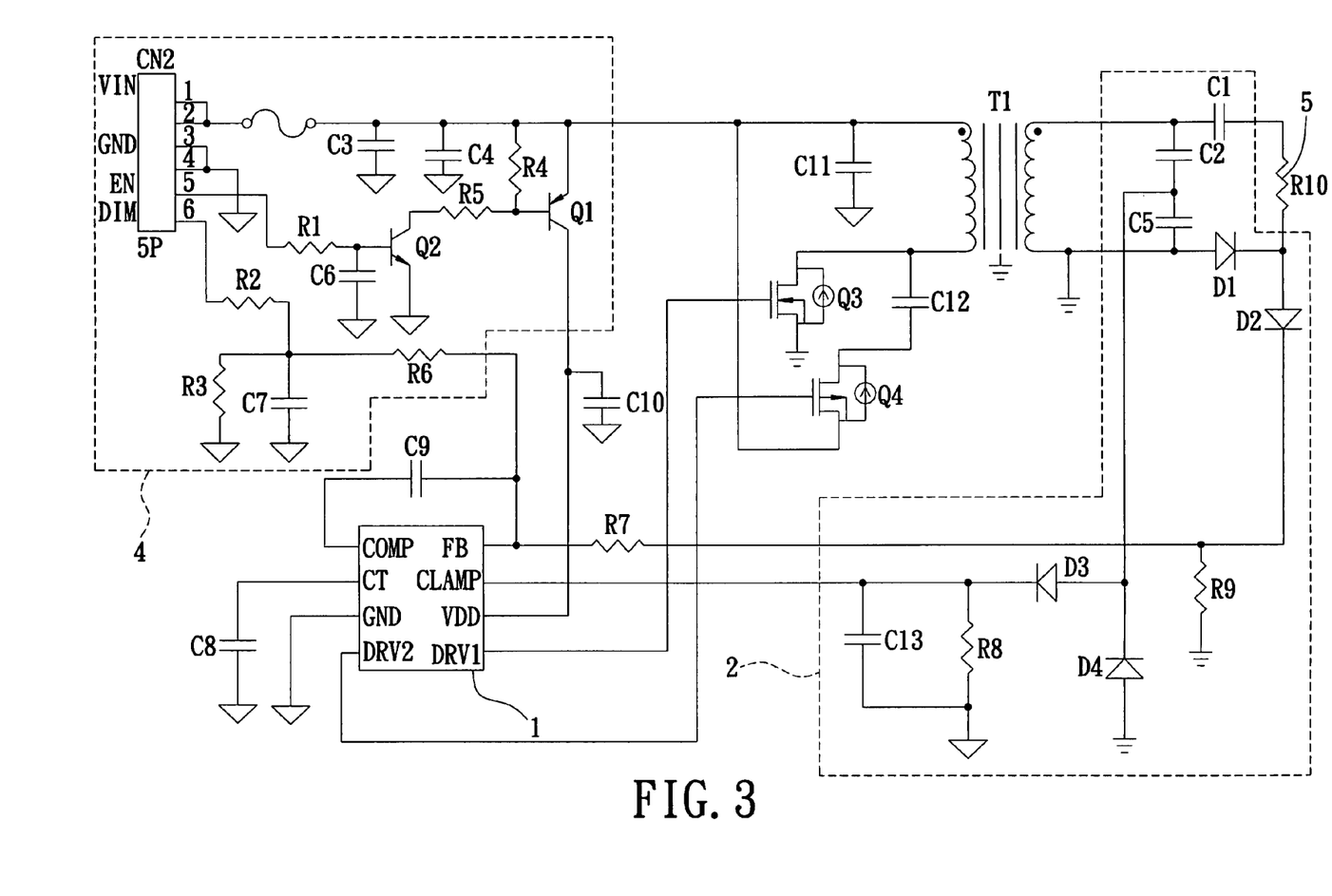
FIG. 3 is a circuit diagram showing how a half-bridge-type control signal generating circuit of the present invention drives a load.

As shown in FIG. 3, a half-bridge-type control signal generating circuit 1 of the present invention is connected to a primary side of a transformer T1 via two electronic switches Q3 and Q4 for controlling the on/off states of the two electronic switches Q3 and Q4. The half-bridge-type control signal generating circuit 1 is also connected to a secondary side of the transformer T1 via a feedback circuit 2 to obtain a feedback signal of a load 5. The half-bridge-type control signal generating circuit 1 is also connected to a power supply unit 4 for providing a working power source Vdd (not shown). The half-bridge-type control signal generating circuit 1 outputs two control signals via a first output terminal DRV1 and a second output terminal DRV2 to control the on/off states of the two electronic switches Q3 and Q4 to convert a DC power source from the power supply unit 4 into an AC power source provided for the load. The above load is a cold cathode fluorescent lamp (CCFL). The electronic switch Q3 is a p-channel FET, while the electronic switch Q4 is an n-channel FET, hence solving the problem of a large energy loss in the prior art, where both the two electronic switches are n-channel FETs or p-channel FETs.

Figure 4:
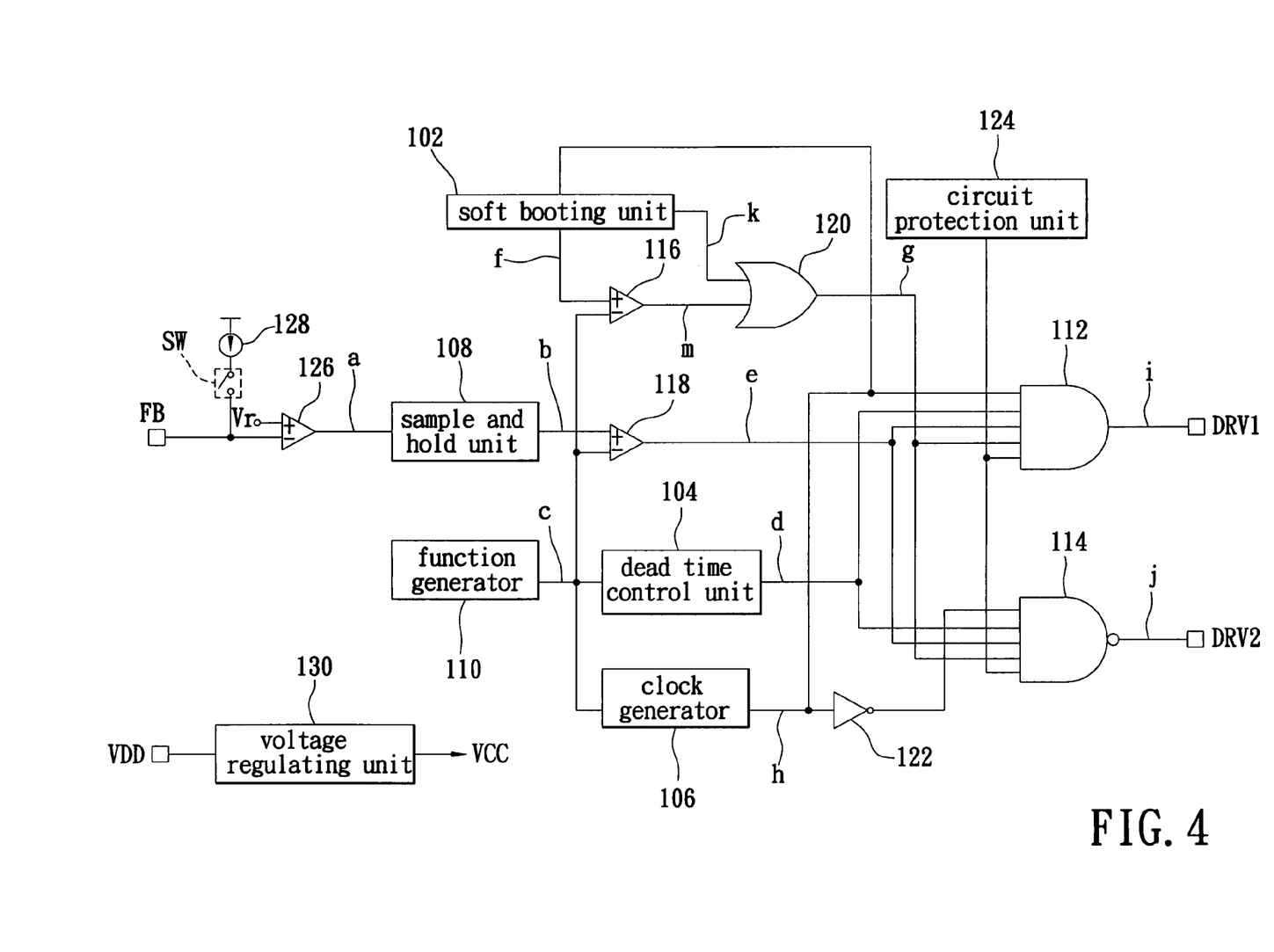
FIG. 4 is a circuit diagram of a half-bridge-type control signal generating circuit of the present invention.

Reference is made to FIG. 4 as well as FIG. 3. The half-bridge-type control signal generating circuit 1 is connected to a control terminal of the electronic switch Q3 via the first output terminal DRV1 and to a control terminal of the electronic switch Q4 via the second output terminal DRV2. A voltage feedback terminal FB and a detection terminal CLAMP are connected to the feedback circuit 2. The half-bridge-type control signal generating circuit 1 comprises an AND-gate logic unit 112 for performing an AND operation, a NAND-gate logic unit 114 for performing a NAND operation, a circuit protection unit 124 connected the AND-gate logic unit 112 and the NAND-gate logic unit 114 and also to the feedback circuit 2 via the detection terminal CLAMP and to the secondary side of the transformer T1 via the feedback circuit 2, a function generator 110, a clock generator 106 connected to the function generator 110 and the AND-gate logic unit 112 and to the NAND-gate logic unit 114 via an inverter 122, a soft boot unit 102 connected to the clock generator 106 for performing boot actions, a sample and hold unit 108 connected to the feedback circuit 2 via an error amplifier 126 and then the voltage feedback terminal FB, a first comparator 116 connected to the soft boot unit 102 and the function generator 110, an OR-gate logic unit 120 connected to the soft boot unit 102, the first comparator 116, the AND-gate logic unit 112 and the NAND-gate logic unit 114 for performing an OR operation, a second comparator 118 connected to the sample and hold unit 108, the function generator 110, the AND-gate logic unit 112 and the NAND-gate logic unit 114, and a dead time control unit connected to the function generator 110, the AND-gate logic unit 112 and the NAND-gate logic unit 114.

The above half-bridge-type control signal generating circuit 1 further comprises a constant current source 128 connected to the error amplifier 126 via a transfer switch SW for providing a constant current. The above half-bridge-type control signal generating circuit 1 further comprises a voltage regulating unit 130 connected to the power supply unit 4 via a working voltage terminal VDD for obtaining DC power source, which provides the required working power VCC for the half-bridge-type control signal generating circuit 1.

The circuit protection unit 124 of the above half-bridge-type control signal generating circuit 1 comprises a low voltage protection circuit, an over-heating protection circuit, an over-voltage protection circuit and a lamp open-circuit protection circuit. The soft boot unit 102 of the above half-bridge-type control signal generating circuit 1 comprises a counter and a digital-to-analog converter.

Figure 5:
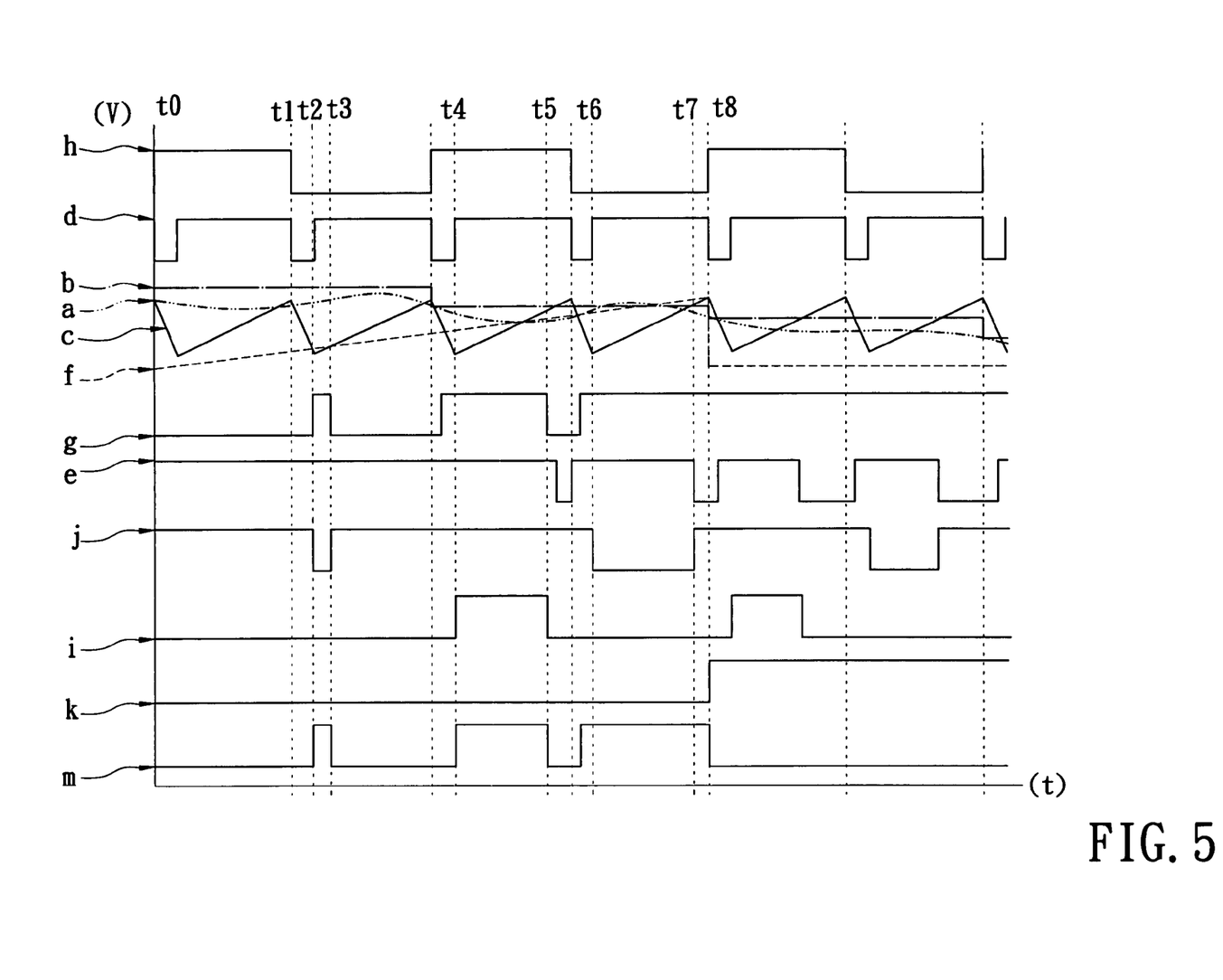
FIG. 5 is a waveform diagram of internal signals of a half-bridge-type control signal generating circuit of the present invention.

As shown in FIG. 5, the x-axis represents time, while the y-axis represents voltage. The internal signals of the half-bridge-type control signal generating circuit 1 of the present invention comprise a voltage feedback signal a, a voltage feedback hold signal b, a sawtooth signal c, a dead time adjustment signal d, a second comparison signal e, a count signal f, an OR-gate signal g, a clock signal h, a first control signal i, a second control signal j, a boot signal k, and a first comparison signal m.

Reference is made to FIG. 4 as well as FIG. 5. The half-bridge-type control signal generating circuit 1 of the present invention makes use of the sample and hold unit 108 to connect the feedback circuit 2 shown in FIG. 3 via the error amplifier 126 and then the voltage feedback terminal FB for obtaining a feedback signal. The feedback signal is the voltage feedback signal a. The sample and hold unit 108 holds and stabilizes the voltage feedback signal a and simultaneously outputs the voltage feedback hold signal b to the second comparator 118. The sample and hold unit 108 holds and stabilizes the voltage feedback signal a to output the voltage feedback hold signal b according to each period of the clock signal h. The function generator 110 outputs the sawtooth signal c and sends it to the clock generator 106 so that the clock generator 106 can generate the clock signal h. The sawtooth signal c is simultaneously sent to the dead time control unit 104 so that the dead time control unit 104 can output the dead time adjustment signal d. The sawtooth signal c is also sent to the second comparator 118, which compares the sawtooth signal c and the voltage feedback hold signal b for outputting the second comparison signal e.

Reference is made to FIG. 4 as well as FIG. 5. The soft boot unit 102 of the half-bridge-type control signal generating circuit 1 of the present invention receives the clock signal h and makes use of the internal counter to count a preset circuit boot time based on the clock signal h. The counted digital signal is processed by the digital-to-analog converter in the soft boot unit 102 to obtain an analog signal for output. The analog signal is the count signal f. When the preset circuit boot time of the soft boot unit 102 is reached, the boot signal k output by the soft boot unit 102 will go from a low level to a high level.

Reference is made to FIG. 4 as well as FIG. 5. The first comparator 116 of the half-bridge-type control signal generating circuit 1 of the present invention receives and compares the sawtooth signal c and the count signal f for outputting the first comparison signal m sent to the OR-gate logic unit 120. The OR-gate logic unit 120 simultaneously receives the boot signal k and the first comparison signal m to output the OR-gate signal g.

Reference is made to FIG. 4 as well as FIG. 5. The AND-gate logic unit 112 of the half-bridge-type control signal generating circuit 1 of the present invention receives the clock signal h, the OR-gate signal g, the second comparison signal e, the dead time adjustment signal d and the protection signal from the circuit protection unit 124 and then performs an AND operation on them for outputting the first control signal i. The NAND-gate logic unit 114 receives the OR-gate signal g, the second comparison signal e, the dead time adjustment signal d and the protection signal from the circuit protection unit 124 and the clock signal h via the inverter 122 and then performs a NAND operation on them for outputting the second control signal j.

Reference is made to FIG. 5 as well as FIG. 4. At time from t0 to t1, the dead time control unit 104 and the clock generator 106 output the dead time adjustment signal d and the clock signal h based on the sawtooth signal c, respectively. The dead time of the dead time adjustment signal d is td. At this time, the clock signal h is at the high level. Because the voltage feedback hold signal b is larger than the sawtooth signal c, the second comparison signal e output by the second comparator 18 is at the high level. Moreover, because the sawtooth signal c is larger than the count signal f, the first comparison signal m output by the first comparator 116 is at the low level. Meanwhile, because the preset boot time is not reached yet, the boot signal k is at the low level. Because both the boot signal k and the first comparison signal m are at the low level, the OR-gate signal g output by the OR-gate logic unit 120 is at the low level. Therefore, at time from t0 to t1, the first control signal i output by the AND-gate logic unit 112 is at the low level, while the second control signal j output by the NAND-gate logic unit 114 is at the high level.

Reference is made to FIG. 5 as well as FIG. 4. At time from t1 to t2, both the clock signal h and the dead time adjustment signal d are at the low level. The output control signals are the same as those at time from t0 to t1. That is, the first control signal i output by the AND-gate logic unit 112 is at the low level, while the second control signal j output by the NAND-gate logic unit 114 is at the high level.

Reference is made to FIG. 5 as well as FIG. 4. At time from t2 to t3, the clock signal h is still at the low level, while the dead time adjustment signal d is at the high level. Because the voltage feedback hold signal b is still larger than the sawtooth signal c, the second comparison signal e is at the high level. Moreover, because the sawtooth signal c is smaller than the count signal f, the first comparison signal m is at the high level. Meanwhile, because the preset boot time is not reached yet, the boot signal k is at the low level. Because the first comparison signal m is at the high level, the OR-gate signal g is at the high level. Therefore, at time from t2 to t3, the first control signal i is still at the low level, and the second control signal j is at the low level.

Reference is made to FIG. 5 as well as FIG. 4. At time from t3 to t4, the output control signals are the same as those at time from t0 to t1. That is, the first control signal i output by the AND-gate logic unit 112 is at the low level, while the second control signal j output by the NAND-gate logic unit 114 is at the high level.

Reference is made to FIG. 5 as well as FIG. 4. At time from t4 to t5, both the clock signal h and the dead time adjustment signal d are at the high level. Because the voltage feedback hold signal b is larger than the sawtooth signal c, the second comparison signal e output by the second comparator 18 is at the high level. Moreover, because the sawtooth signal c is smaller than the count signal f the first comparison signal m output by the first comparator 116 is at the high level. Meanwhile, because the preset boot time is not reached yet, the boot signal k is at the low level. Because the first comparison signal m is at the high level, the OR-gate signal g output by the OR-gate logic unit 120 is at the high level. Therefore, at time from t4 to t5, both the first control signal i output by the AND-gate logic unit 112 and the second control signal j output by the NAND-gate logic unit 114 are at the high level.

Reference is made to FIG. 5 as well as FIG. 4. At time from t5 to t6, the output control signals are the same as those at time from t0 to t1. That is, the first control signal i output by the AND-gate logic unit 112 is at the low level, while the second control signal j output by the NAND-gate logic unit 114 is at the high level.

Reference is made to FIG. 5 as well as FIG. 4. At time from t6 to t7, the clock signal h is at the low level, while the dead time adjustment signal d is at the high level. Because the voltage feedback hold signal b is larger than the sawtooth signal c, the second comparison signal e output by the second comparator 18 is at the high level. Moreover, because the sawtooth signal c is smaller than the count signal f, the first comparison signal m output by the first comparator 116 is at the high level. Meanwhile, because the preset boot time is not reached yet, the boot signal k is at the low level. Because the first comparison signal m is at the high level, the OR-gate signal g output by the OR-gate logic unit 120 is at the high level. Therefore, at time from t6 to t7, both the first control signal i output by the AND-gate logic unit 112 and the second control signal j output by the NAND-gate logic unit 114 are at the low level.

Reference is made to FIG. 5 as well as FIG. 4. At time from t7 to t8, the output control signals are the same as those at time from t0 to t1. That is, the first control signal i output by the AND-gate logic unit 112 is at the low level, while the second control signal j output by the NAND-gate logic unit 114 is at the high level.

Reference is made to FIG. 5 as well as FIG. 4. The time from t0 to t8 is the circuit boot time. After t8, the first control signal i and the second control signal j output by the AND-gate logic unit 112 and the NAND-gate logic unit 114 will be affected by the clock signal h, the dead time adjustment signal d and the second comparison signal e to change.

At time t8, when the present boot time of the circuit is reached, the boot signal k will go from the low level to the high level. Therefore, the OR-gate signal g output by the OR-gate logic unit 120 is at the high level. Therefore, the first control signal i is obtained through an AND operation of the clock signal h, the dead time adjustment signal d and the second comparison signal e after boot, while the second control signal j is obtained through a NAND operation of the reverse clock signal h, the dead time adjustment signal d and the second comparison signal e after boot.

Reference is made to FIG. 5 as well as FIG. 4. The circuit protection unit 124 detects the working situation of the load 5 through the feedback circuit 2 shown in FIG. 3. When the voltage of the load 5 is too low or too high or the lamp is open-circuited, the circuit protection unit 124 will start functioning. The circuit protection unit 124 comprises a low voltage protection circuit, an over-heating protection circuit, an over-voltage protection circuit, and a lamp open-circuit protection circuit. The circuit protection unit 124 gets a feedback signal via the feedback circuit 2 and outputs a DISABLE signal to the AND-gate logic unit 112 and the NAND-gate logic unit 114 to disable the first control signal i and the second control signal j and stop working.

When the load 5 has an over-voltage, the over-voltage protection circuit will control the transfer switch SW to be on so that the constant current of the constant current source 128 will flow into a resistor (not shown) to get a voltage higher than a reference voltage Vr. At this time, the voltage feedback signal output by the error amplifier 126 will drop to the low level. Therefore, the voltage feedback hold signal b is similarly at the low level, and the second comparison signal e output by the second comparator 118 is at the low level. Therefore, both the first control signal i and the second control signal j output by the AND-gate logic unit 112 and the NAND-gate logic unit 114 are at the low level (the DISABLE state), hence accomplishing over-voltage protection of the load 5.

When the over-voltage problem is resolved, the over-voltage protection circuit will control the transfer switch SW to be off for restoring the circuit to normal operations.

A half-bridge-type control signal generating method of the present invention comprises the steps of: generating a sawtooth signal by a function generator; outputting a clock signal by a clock generator based on the sawtooth signal; generating a reverse clock signal through an inverter operation of the clock signal; outputting a dead time adjustment signal by a dead time control unit based on the sawtooth signal; sampling and holding a voltage feedback signal by a sample and hold unit connected to a feedback circuit via an error amplifier; comparing the voltage feedback signal and the sawtooth signal by a second comparator and then outputting a second comparison signal; counting the clock signal and outputting a count signal and a boot signal by a soft boot unit; comparing the count signal and the sawtooth signal by a first comparator and then outputting a first comparison signal; generating an OR-gate signal by performing an OR operation to the boot signal and the first comparison signal; generating a first control signal by performing an AND operation to the dead time adjustment signal, the second comparison signal, the clock signal and the OR-gate signal; and finally generating a second control signal by performing a NAND operation to the dead time adjustment signal, the second comparison signal, the reverse clock signal and the OR-gate signal.

To sum up, the present invention provides a half-bridge-type control signal generating circuit and a method thereof, which can provide two control signals to control switching actions of two electronic switches of a half-bridge-type inverter circuit. Moreover, the present invention can make use of a power source protection unit to obtain various situations of the load end at the secondary side of the transformer and various statues of the circuit like a too-low output voltage, a too-high output voltage, an open-circuited lamp or a too-high temperature via the feedback circuit for stopping the switching actions of the two electronic switches, hence accomplishing circuit protection. Additionally, the present invention makes use of a dead time control unit to get a constant dead time for avoiding burnout of the transformer due to the two electronic switches being simultaneously on. The present invention can also control and change the switching actions of the two electronic switches to provide the required electric power for the load based on the power requirement at the load end. Moreover, the present invention uses a soft boot unit to activate the two electronic switches for avoiding a too-large spike current or voltage when activating and lengthening the lifetime of the lamp. The present invention can further use a sample and hold unit to receive a voltage feedback signal of the load end and perform a hold action of the voltage feedback signal at each clock signal for improving the imbalanced phenomenon of signals output to the load in the prior art. The present invention also solves the problem of a large energy loss in the prior art, where both the two electronic switches are n-channel FETs or p-channel FETs.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A half-bridge-type control signal generating circuit connected to a primary side of a transformer via two electronic switches for controlling on/off states of said two electronic switches to convert a DC power source into an AC power source provided for a load, said half-bridge-type control signal generating circuit comprising:
   an AND-gate logic unit for performing an AND operation and outputting a first control signal;
   a NAND-gate logic unit for performing a NAND operation and outputting a second control signal;
   a circuit protection unit connected to said AND-gate logic unit and said NAND-gate logic unit and to a secondary side of said transformer via a feedback circuit for receiving a feedback signal;
   a function generator for generating a sawtooth signal;
   a clock generator connected to said function generator and said AND-gate logic unit and to said NAND-gate logic unit via an inverter for generating a clock signal based on said sawtooth signal;
   a soft boot unit connected to said clock generator for receiving said clock signal and outputting a boot signal and a count signal to perform boot actions;
   a sample and hold unit connected to said feedback circuit via an error amplifier for getting a voltage feedback signal and outputting a voltage feedback hold signal;
   a first comparator connected to said soft boot unit and said function generator for comparing said sawtooth signal and said count signal to output a first comparison signal;
   an OR-gate logic unit connected to said soft boot unit, said first comparator, said AND-gate logic unit and said NAND-gate logic unit for performing an OR operation to said boot signal and said first comparison signal;
   a second comparator connected to said sample and hold unit, said function generator, said AND-gate logic unit and said NAND-gate logic unit for comparing said sawtooth signal and said voltage feedback hold signal to output a second comparison signal; and
   a dead time control unit connected to said function generator, said AND-gate logic unit and said NAND-gate logic unit for receiving said sawtooth signal to output a dead time adjustment signal.

2. The half-bridge-type control signal generating circuit as claimed in claim 1, further comprising a constant current source connected to said error amplifier via a transfer switch for providing a constant current.

3. The half-bridge-type control signal generating circuit as claimed in claim 1, further comprising a voltage regulating unit connected to said DC power source for providing the required power for said half-bridge-type control signal generating circuit.

4. The half-bridge-type control signal generating circuit as claimed in claim 1, wherein said soft boot unit comprises:
   a counter for counting a boot time; and
   a digital-to-analog converter for outputting the boot time in an analog way.

5. The half-bridge-type control signal generating circuit as claimed in claim 1, wherein said circuit protection unit comprises:
   a low voltage protection circuit for low voltage protection of circuit according to said feedback signal;
   an over-heating protection circuit for over-heat protection of circuits according to said feedback signal;
   an over-voltage protection circuit for over-voltage protection of circuits according to said feedback signal; and
   a lamp open-circuit protection circuit for open-circuit protection of loads according to said feedback signal.

6. The half-bridge-type control signal generating circuit as claimed in claim 5, wherein said over-voltage protection circuit controls on/off states of said transfer switch.

7. The half-bridge-type control signal generating circuit as claimed in claim 1, wherein said load is a cold cathode fluorescent lamp.

8. A half-bridge-type control signal generating method comprising the steps of:
   generating a sawtooth signal by a function generator;
   generating a clock signal by a clock generator based on said sawtooth signal;
   generating a reverse clock signal through an inverter operation of said clock signal;
   generating a dead time adjustment signal by a dead time control unit based on said sawtooth signal;
   sampling and holding a voltage feedback signal by a sample and hold unit connected to a feedback circuit via an error amplifier;
   comparing said voltage feedback signal and said sawtooth signal by a second comparator and then outputting a second comparison signal;
   counting said clock signal and outputting a count signal and a boot signal by a soft boot unit;
   comparing said count signal and said sawtooth signal by a first comparator and then outputting a first comparison signal;
   generating an OR-gate signal by performing an OR operation to said boot signal and said first comparison signal;
   generating a first control signal by performing an AND operation to said dead time adjustment signal, said second comparison signal, said clock signal and said OR-gate signal; and
   generating a second control signal by performing a NAND operation to said dead time adjustment signal, said second comparison signal, said reverse clock signal and said OR-gate signal.

* * * * *